(12) United States Patent
Zheng et al.

(10) Patent No.: US 11,215,554 B2
(45) Date of Patent: Jan. 4, 2022

(54) GAS DETECTING APPARATUS AND METHOD BASED ON TERAHERTZ SPECTROSCOPY

(71) Applicant: Tsinghua University, Beijing (CN)

(72) Inventors: Xiao-Ping Zheng, Beijing (CN); Shan Zhang, Beijing (CN); Hua Geng, Beijing (CN); Xiao-Jiao Deng, Beijing (CN); Jia Li, Beijing (CN); Zhi-Jie Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 16/880,067

(22) Filed: May 21, 2020

(65) Prior Publication Data

US 2020/0371021 A1 Nov. 26, 2020

(30) Foreign Application Priority Data

May 22, 2019 (CN) .......................... 201910430311.4

(51) Int. Cl.
*G01N 21/35* (2014.01)
*G01N 21/05* (2006.01)
*G01J 3/02* (2006.01)
*G01N 21/3504* (2014.01)
*G01N 21/3581* (2014.01)

(52) U.S. Cl.
CPC ........ *G01N 21/3504* (2013.01); *G01J 3/0275* (2013.01); *G01J 3/0286* (2013.01); *G01N 21/05* (2013.01); *G01N 21/3581* (2013.01); *G01N 2021/052* (2013.01)

(58) Field of Classification Search
CPC .. G01J 3/0275; G01J 3/0286; G01N 21/0332; G01N 21/05; G01N 21/3504; G01N 21/3518; G01N 21/3581; G01N 2021/052; G01N 2021/3536; G01N 2021/354
See application file for complete search history.

(56) References Cited

U.S. PATENT DOCUMENTS

2015/0260695 A1* 9/2015 Spartz .................... G01N 30/74
250/339.01
2016/0132617 A1* 5/2016 Liu ........................ G01J 3/0294
703/2

FOREIGN PATENT DOCUMENTS

| CN | 104713596 | 6/2015 |
| CN | 105404228 | 3/2016 |
| CN | 106647883 | 5/2017 |
| CN | 108181261 | 6/2018 |
| CN | 109283141 | 1/2019 |

\* cited by examiner

*Primary Examiner* — Mark R Gaworecki

(57) ABSTRACT

A gas detecting apparatus and a gas detecting method based on terahertz spectroscopy are provided. The apparatus includes a sample chamber allowing a terahertz wave to pass therethrough; a gas feeding unit connected to the sample chamber to feed gas into the sample chamber; a gas outputting unit connected to the sample chamber to output gas from the sample chamber; and a vacuum pump connected to the sample chamber to evacuate the sample chamber. The apparatus further comprises one or more of a pressure gauge disposed on the sample chamber, an anemometer disposed on the sample chamber, a humidity regulation device connected to the sample chamber, and a temperature regulation device connected to the sample chamber.

17 Claims, 2 Drawing Sheets

GAS DETECTING APPARATUS AND METHOD BASED ON TERAHERTZ SPECTROSCOPY

CROSS-REFERENCE TO RELATED APPLICATIONS

This application claims all benefits accruing under 35 U.S.C. § 119 from China Patent Application No. 201910430311.4 filed on May 22, 2019 in the China National Intellectual Property Administration, the contents of which are incorporated by reference herein.

FIELD

The present disclosure relates to the field of detection, in particular to gas detecting apparatuses and methods based on terahertz spectroscopy.

BACKGROUND

A terahertz wave is an electromagnetic wave having a frequency ranged between 0.1 THz and 10 THz. Vibration frequencies and rotations frequencies of most polar molecules and macromolecules are within this frequency range. Most materials can interact with the terahertz wave to some degree, and each material has its own frequency spectrum, which can be considered as a kind of "fingerprint". Therefore, terahertz spectroscopy is uniquely advantageous for material identification and quantitative analysis.

SUMMARY

A gas detecting apparatus based on terahertz spectroscopy is provided in the present disclosure. The gas detecting apparatus includes a sample chamber, a gas feeding unit, a gas outputting unit, and a vacuum pump. The sample chamber allows a terahertz wave to pass therethrough. The gas feeding unit is connected to the sample chamber to feed gas into the sample chamber. The gas outputting unit is connected to the sample chamber to output gas from the sample chamber. The vacuum pump is connected to the sample chamber to evacuate the sample chamber.

The gas detecting apparatus further includes one or more of a pressure gauge, an anemometer, a humidity regulation device, and a temperature regulation device. The pressure gauge is disposed on the sample chamber to measure a pressure in the sample chamber. The anemometer is disposed on the sample chamber to measure a gas flow rate in the sample chamber. The humidity regulation device is connected to the sample chamber to regulate humidity in the sample chamber. The temperature regulation device is connected to the sample chamber to regulate temperature in the sample chamber.

In an embodiment, the gas feeding unit includes a gas feeding tube connected to the sample chamber. The gas feeding tube includes a main gas feeding tube and a plurality of branch gas feeding tubes. One end of the main gas feeding tube is connected to the sample chamber, and the other end of the main gas feeding tube is connected to the plurality of branch gas feeding tubes. The gas feeding unit further includes a plurality of gas feeding valves respectively disposed on the plurality of branch gas feeding tubes.

In an embodiment, the apparatus further includes a background gas source and a target gas source. One of the plurality of branch gas feeding tubes is connected to the background gas source. Another of the plurality of branch gas feeding tubes is connected to the target gas source.

In an embodiment, the humidity regulation device includes a moisture supplying device and a humidity regulating valve. The moisture supplying device configured to be in fluid communication with the sample chamber to supply liquid water and/or water vapor into the sample chamber. The humidity regulating valve is disposed between the moisture supplying device and the sample chamber to regulate an amount and/or a flow rate of the liquid water and/or water vapor supplied into the sample chamber.

In an embodiment, the humidity regulation device further includes a filter disposed between the moisture supplying device and the sample chamber to filter the liquid water and/or water vapor supplied into the sample chamber.

In an embodiment, the humidity regulation device further includes a hygrometer disposed on the sample chamber to measure the humidity in the sample chamber.

In an embodiment, the temperature regulation device includes a heater disposed on the sample chamber to heat the gas in the sample chamber and a thermometer disposed on the sample chamber to measure the temperature in the sample chamber.

In an embodiment, the apparatus further includes a terahertz wave generating unit and a terahertz wave detecting unit disposed outside the sample chamber. The terahertz wave generating unit is configured to send the terahertz wave into the sample chamber from a first side of the sample chamber. The terahertz wave detecting unit is configured to detect the terahertz wave transmitted out from a second side opposite to the first side of the sample chamber.

In an embodiment, the gas feeding unit is disposed at the first side of the sample chamber, and the gas outputting unit is disposed at the second side of the sample chamber.

In an embodiment, the target gas source includes a first gas source and a second gas source different in component with the first gas source. Two of the plurality of branch gas feeding tubes are respectively connected to the first gas source and the second gas source.

A method for detecting a gas based on terahertz spectroscopy by using the apparatus is further provided. The method includes: evacuating the sample chamber by using the vacuum pump; feeding the gas into the evacuated sample chamber via the gas feeding unit, and regulating one or more environmental parameters inside the sample chamber via one or more of the gas feeding unit, the gas outputting unit, the humidity regulation device, and the temperature regulation device; having the terahertz wave passing through the sample chamber and interacting with the gas in the sample chamber; and detecting the terahertz wave transmitted out from the sample chamber to obtain a terahertz spectrum.

In an embodiment, the method further includes closing the gas feeding unit and the gas outputting unit, thereby obtaining a gas flow static environment in the sample chamber during the detecting the terahertz wave.

In an embodiment, the detecting the terahertz wave is proceeded during the gas flowing through the sample chamber thereby obtaining a gas flow dynamic environment in the sample chamber during the detecting the terahertz wave.

In an embodiment, the regulating one or more environmental parameters inside the sample chamber includes regulating a gas composition, a concentration of a target gas component, and/or a pressure in the sample chamber via the plurality of gas feeding valves.

In an embodiment, the detecting the terahertz wave is proceeded during the regulating the gas composition, the concentration of the target gas component, and/or the pressure in the sample chamber.

In an embodiment, the regulating one or more environmental parameters inside the sample chamber includes regulating the humidity in the sampling chamber via the humidity regulation device.

In an embodiment, the regulating one or more environmental parameters inside the sample chamber includes regulating the temperature in the sampling chamber via the temperature regulation device.

In the present disclosure, the environmental parameters inside the sample chamber can be regulated to investigate the influences of one or more of environmental parameters on the gas detection result to reduce a background noise of the terahertz spectrum, which is favorable to the quantitative analysis and the qualitative analysis of the gas.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiment of the present disclosure, and is not intended to limit the scope of the present disclosure.

The detection of a terahertz spectrum of target gas in a natural environment can be affected by environmental factors such as humidity, wind speed, wind direction, and composition of air. It is difficult to simulate the actual environment in a laboratory to study the target gas terahertz spectrum in a natural environment.

Figure 1:
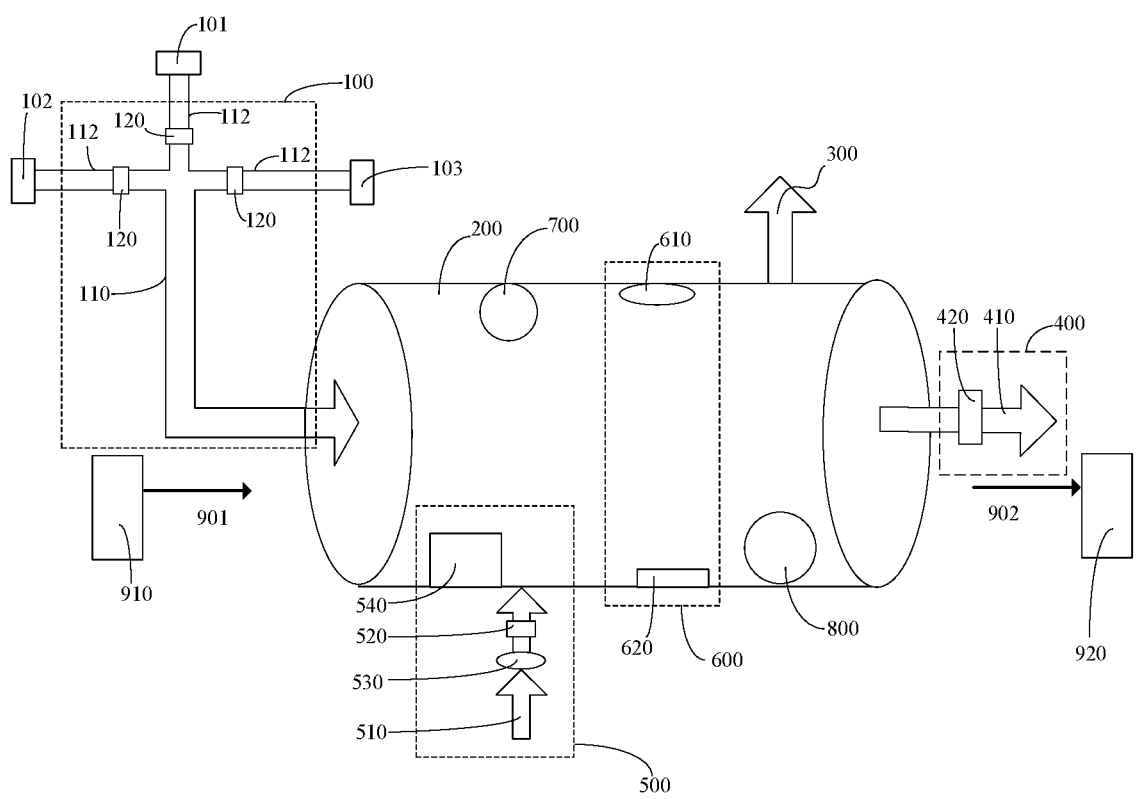
FIG. 1 is a schematic structural view of a gas detecting apparatus based on terahertz spectroscopy according to an embodiment of the present disclosure.

In view of this, an apparatus for detecting gas based on terahertz spectroscopy is provided in the present disclosure, providing a sample chamber whose environment parameters are adjustable. Referring to FIG. 1, the apparatus includes a gas feeding unit 100, a sample chamber 200, a vacuum pump (for example, a molecular pump) 300, and a gas outputting unit 400. The apparatus can further include one or more of a humidity regulation device 500, a temperature regulation device 600, a pressure gauge 700, and an anemometer (for example, a miniature anemorumbometer) 800. In an embodiment, the apparatus includes both the humidity regulation device 500 and the temperature regulation device 600.

The sample chamber 200 can be connected to the gas feeding unit 100 and the gas outputting unit 400, respectively. In an embodiment, the sample chamber 200 has two opposite openings. One opening of the sample chamber 200 is connected to the gas feeding unit 100, and the other opening of the sample chamber 200 is connected to the gas outputting unit 400.

The gas feeding unit 100 can control the feeding of gas into the sample chamber 200. The gas feeding unit 100 can include a gas feeding tube connected to the sample chamber 200 and a gas feeding valve 120 disposed on the gas feeding tube. The gas feeding valve can regulate an amount and/or a flow rate of the gas fed into the sample chamber 200 via the gas feeding tube. The gas fed into the sample chamber 200 can be a single-component gas or a multi-component gas.

The gas outputting unit 400 can control the output of the gas from the sample chamber 200. The gas outputting unit 400 can include a gas outputting tube 410 connected to the sample chamber 200 and a gas outputting valve 420 disposed on the gas outputting tube 410. The gas outputting valve 420 can regulate an amount and/or a flow rate of the gas output from the sample chamber 200 via the gas outputting tube 410.

The apparatus in the present disclosure can achieve a static detection and/or a dynamic detection by controlling the gas feeding valve and the gas outputting valve 420. By maintaining the gas outputting valve 420 in a close state and closing the gas feeding valve after the gas is fed into the sample chamber 200, the gas in the sample chamber can be in a static state, and the static detection of the terahertz wave can be performed in the gas static state. By opening the gas feeding valve and/or the gas outputting valve 420, and regulating the flow rate of the gas fed into the sample chamber 200 and the flow rate of the gas output from the sample chamber 200 via the gas feeding valve and/or the gas outputting valve 420, the gas in the sample chamber can be in a flowing state and the dynamic detection of the terahertz wave can be performed in the gas flowing state. The dynamic detection can simulate an actual detection under windy condition in a natural environment. Moreover, a pressure in the sample chamber 200 can also be regulated by regulating the amounts and/or the flow rates of the gas fed into and/or output from the sample chamber 200 through the gas feeding valve and/or the gas outputting valve 420.

The gas feeding tube can include a main gas feeding tube 110 and a plurality of branch gas feeding tubes 112 configured to convey different gas components. One end of the main gas feeding tube 110 can be connected to the sample chamber 200, and the other end of the main gas feeding tube 110 can be connected to the plurality of branch gas feeding tubes 112, respectively. The number of the gas feeding valves can be more than one, and the plurality of gas feeding valves 120 are disposed on the plurality of branch gas feeding tubes 112, respectively.

The plurality of branch gas feeding tubes 112 can be in fluid communication with different gas component sources. One or more gas components can be provided into the main gas feeding tube 110 via the plurality of branch gas feeding tubes 120, mixed in the main gas feeding tube 110, and then fed into the sample chamber 200. By regulating each of the plurality of gas feeding valves 120, a composition, the amount, and/or the flow rate of the gas fed into the sample chamber 200 can be regulated.

The gas feeding unit 100 can further include a plurality of gas flowmeters (not shown) disposed on the plurality of gas feeding valves 120, respectively, to measure a flow rate of each gas component provided into the main gas feeding tube 110.

The numbers of the branch gas feeding tubes 112, the gas feeding valves 120, and the gas flowmeters are not limited herein and can be set according to actual needs. Both the gas feeding valve 120 and the gas outputting valve 420 can be one-way valves.

In an embodiment, one of the branch gas feeding tubes 112 can be in fluid communication with a source 101 of a background gas component. Another of the branch gas feeding tubes 112 can be in fluid communication with a source 102 of one target gas component (e.g., a first gas source). A third of the branch gas feeding tubes 112 can be in fluid communication with a source 103 of another target gas component (e.g., a second gas source). The background gas component refers to a gas component substantially has no absorption to the terahertz wave. The background gas can be nitrogen gas. The target gas component refers to a gas component to be detected. The target gas component can absorb the terahertz wave. By measuring variation of the terahertz wave before and after interacting with the target gas component, a quantitative analysis and a qualitative analysis of the target gas component can be achieved. The background gas component can be used to regulate a pressure in the sample chamber 200. The background gas component can also be used to form a dynamic detection environment by flowing through the sample chamber 200 from the gas feeding tube to the gas outputting tube 410.

The pressure gauge 700 can be disposed on the sample chamber 200 to measure the pressure in the sample chamber 200 in real time. The pressure gauge 700 can also be configured to display a real-time pressure in the sample chamber 200. The pressure gauge 700 can include a pressure gauge switch. The pressure gauge 700 can be turned on or turned off via the pressure gauge switch to initiate or terminate the pressure measurement.

The anemometer 800 can be disposed on the sample chamber 200 to measure an actual flow rate of the gas flowing through the sample chamber 200. The actual flow rate of the gas flowing through the sample chamber 200 can be used to verify a theory flow rate of the gas flowing through the sample chamber 200 calculated from the flow rate of each gas component supplied via the plurality of branch gas feeding tubes 120, the flow rate of the gas output from the sample chamber 200, and a volume of the sample chamber 200. The anemometer 800 can include an anemometer switch. The anemometer 800 can be turned on or turned off via the anemometer switch to initiate or terminate the measurement for the flow rate of the gas flowing through the sample chamber 200. The anemometer 800 can display a real-time flow rate of the gas measured.

The vacuum pump 300 can be connected to the sample chamber 200. The vacuum pump 300 is configured to evacuate the sample chamber 200 before the detection to ensure the accuracy of the detection. The vacuum pump 300 can include a vacuum switch. The vacuum pump 300 can be turned on or turned off via the vacuum switch to initiate or terminate the evacuation operation of the vacuum pump 300.

The humidity regulation device 500 can be connected to the sample chamber 200 and can regulate humidity in the sample chamber 200. The humidity regulation device 500 can include a moisture supplying device 510 and a humidity regulating valve 520. The moisture supplying device 510 can be in fluid communication with the sample chamber 200 to supply a liquid water and/or water vapor to the sample chamber 200. The humidity regulating valve 520 can be disposed between the humidity regulation device 500 and the sample chamber 200 to regulate an amount and/or a flow rate of the liquid water and/or the water vapor supplied to the sample chamber 200, so as to regulate the humidity in the sample chamber 200. The humidity regulating valve 520 can be a one-way valve.

The humidity regulation device 500 can further include a filter 530 disposed between the moisture supply device 510 and the sample chamber 200. The filter 530 is configured to filter out an impurity from the liquid water and/or the water vapor supplied to the sample chamber 200 to ensure the accuracy of the detection.

The humidity regulation device 500 can further include a hygrometer 540. The hygrometer 540 can be disposed on the sample chamber 200 to measure the humidity in the sample chamber 200. The hygrometer 540 can also be configured to display the real-time humidity in the sample chamber 200. The hygrometer 540 can include a hygrometer switch. The hygrometer 540 can be turned on or turned off via the hygrometer switch to initiate or terminate the humidity measurement.

The temperature regulation device 600 can regulate temperature in the sample chamber 200. The temperature regulation device 600 can include a heater 610 disposed on the sample chamber 200 to heat the gas in the sample chamber 200 and regulate the temperature in the sample chamber 200. The heater 610 can be any heater known in the art. In an embodiment, the heater 610 includes a heating plate attached on an inner wall of the sample chamber 200. The heater 610 can include a heater switch. The heater 610 can be turned on or turned off via the heater switch to initiate or terminate the heating operation.

The temperature regulation device 600 can further include a thermometer 620 disposed on the sample chamber 200 to measure the temperature in the sample chamber 200. The thermometer 620 can be configured to display the real-time temperature in the sample chamber 200. The thermometer 620 can be any appropriate thermometer known in the art. In an embodiment, the thermometer 620 is a patch thermometer attached on an outer wall of the sample chamber 200. The thermometer 620 can include a thermometer switch. The thermometer 620 can be turned on or turned off via the thermometer switch to initiate or terminate the temperature measurement.

A shape of the sample chamber 200 is not limited herein and can be selected according to needs. The shape of the sample chamber 200 may depend on the specific structure of the apparatus and the installation space of the sample chamber 200. For example, the sample chamber 200 can have a cylindrical shape. When performing the detection, the sample chamber 200 can have its central axis parallel to a horizontal plane or tilted to the horizontal plane.

The apparatus can further include a terahertz wave generating unit 910 and a terahertz wave detecting unit 920. A terahertz wave 901 generated by the terahertz wave generating unit 910 can pass through the sample chamber 200 to interact with (for example, the terahertz wave with a certain frequency is to be absorbed by) the gas in the sample chamber 200. After the interaction, a terahertz wave 902 interacted with the gas can exit from the sample chamber 200 and be received by the terahertz wave detecting unit 920 to obtain the terahertz spectrum of the gas in the sample chamber 200. The quantitative analysis and the qualitative analysis of the gas can be achieved based on the terahertz spectroscopy.

In the apparatus provided in the present disclosure, the static detection and the dynamic detection can be performed by controlling the gas feeding unit 100 and the gas outputting unit 400. Moreover, a single-factor detection and a multi-factor detection can be performed by regulating one or more of environmental parameters inside the sample chamber 200 via one or more of the gas feeding unit 100, the gas outputting unit 400, the humidity regulation device 500, the temperature regulation device 600, the pressure gage 700, and the anemometer 800. For example, the humidity in the sample chamber 200 can be regulated via the humidity regulation device 500, the temperature in the sample chamber 200 can be regulated via the temperature regulation device 600, the pressure in the sample chamber 200, the mass concentration and the composition of the gas in the sample chamber 200, and the flow rate of the gas flowing through the sample chamber 200 can be regulated via the gas feeding unit 100 and/or the gas outputting unit 400. Thus, the influences of one or more of environmental parameters on the gas detection result can be investigated, which can be utilized to simulate the natural environment of the actual detection.

Figure 2:
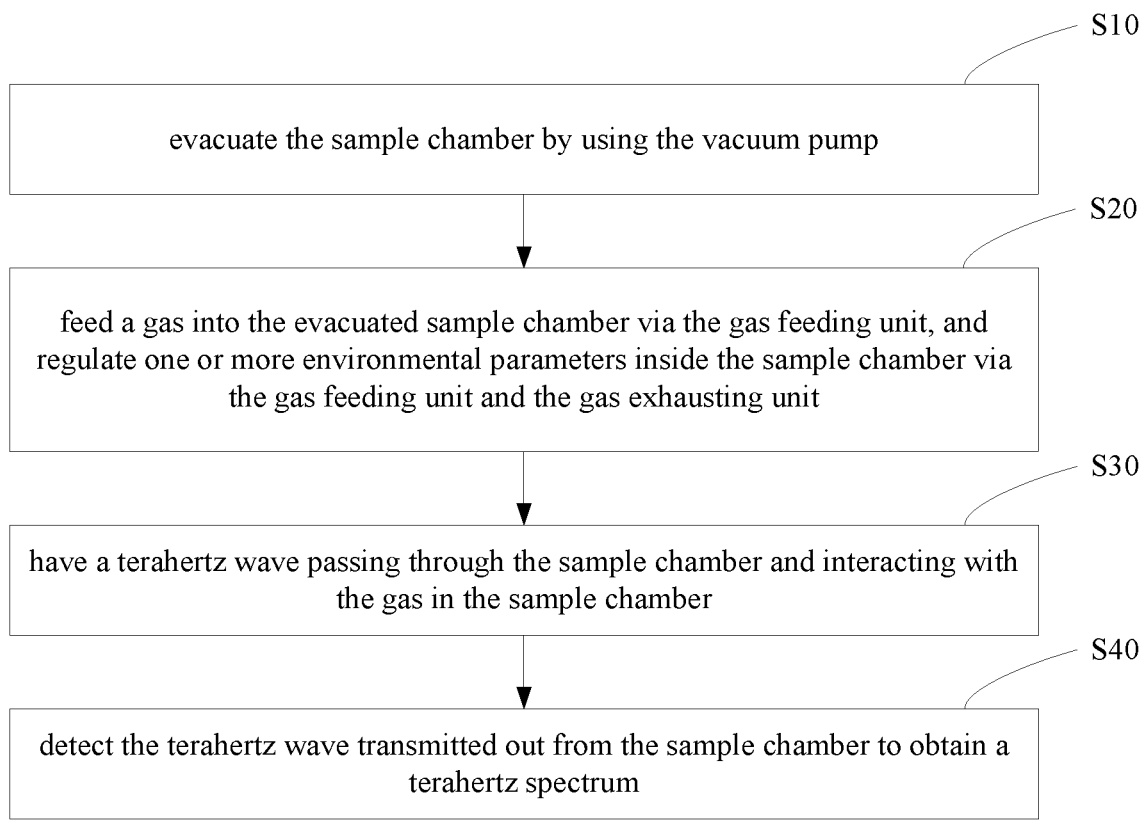
FIG. 2 is flowchart of a method for gas detecting based on terahertz spectroscopy according to an embodiment of the present disclosure.

Referring to FIG. 2, a method for detecting a gas based on terahertz spectroscopy by using the above-described apparatus is further provided in the present disclosure. The method can include:

S10, evacuating the sample chamber 200 by using the vacuum pump 300;

S20, feeding gas into the evacuated sample chamber 200 via the gas feeding unit 100, and regulating one or more environmental parameters inside the sample chamber 200 via one or more of the gas feeding unit 100, the gas outputting unit 400, the humidity regulation device 500, and the temperature regulation device 600;

S30, having a terahertz wave passing through the sample chamber 200 and interacting with the gas in the sample chamber; and S40, detecting the terahertz wave transmitted out from the sample chamber 200 to obtain a terahertz spectrum.

All the valves and switches can be in a close state in S10.

In S10, the evacuation operation can be initiated by opening the vacuum switch. After the sample chamber 200 is evacuated, the evacuation operation can be terminated by closing the vacuum switch.

In an embodiment, S20 can include:

S211, opening at least one of the plurality of gas feeding valves 120 to fed the gas into the evacuated sample chamber 200, and closing all gas feeding valves 120 after a desired amount of the gas is contained in the sample chamber 200, thereby obtaining a static environment.

The static detection of the terahertz wave can be performed in the static environment. The gas outputting valve 420 can be maintained in the close state throughout the static detection.

S211 can specifically include:

regulating the composition of the gas in the sample chamber 200, the mass concentration of the target gas component in the sample chamber 200, and/or the pressure in the sample chamber 200 via the plurality of gas feed valves 120.

The composition of the gas in the sample chamber 200 can be regulated by regulating a ratio of the amount of the background gas component to the amount of the target gas component fed into the sampling chamber 200 via the corresponding gas feed valve(s). The composition of the gas in the sample chamber 200 can be further regulated by regulating ratios of amounts of a plurality of target gas components, for example, a ratio of the amount of the first target gas component to the amount of the second target gas component, via the corresponding gas feed valves.

The mass concentration of the target gas refers to a ratio of the mass of the target gas fed into the sample chamber 200 to the volume of the sample chamber 200. The mass concentration of the target gas in the sample chamber 200 can be regulated by regulating the amount of the target gas fed into the sample chamber 200 via the corresponding gas feed valve(s).

The pressure in the sample chamber 200 can be regulated by regulating the amounts of the background gas component and the target gas component fed into the sampling chamber 200 via the corresponding gas feed valves.

When the gas is a single component gas, the pressure in the sampling chamber 200 is proportional to the amount of the gas fed into the sampling chamber 200 and the mass concentration of the gas in the sampling chamber 200. The mass concentration of the gas in the sampling chamber 200 can be calculated according to an equation (I):

$$c = \frac{n}{V_0}, \qquad (I)$$

wherein c denotes the mass concentration of the gas in the sampling chamber 200, n denotes the mass of the gas in the sampling chamber 200, and $V_0$ denotes the volume of the sampling chamber 200. The mass of the gas fed into the sampling chamber 200 can be calculated according to an equation (II):

$$n = \frac{V}{V_m} \qquad (II)$$

wherein V denotes the amount (volume) of the gas fed into the sampling chamber 200, and $V_m$ denotes a molar volume of the gas under standard atmospheric pressure.

When the gas is a multi-component gas, the pressure in the sampling chamber 200 can be calculated according to the equation (III):

$$PV_0 = (n_1 + n_2)RT \qquad (III)$$

wherein P denotes the pressure in the sampling chamber 200, $V_0$ denotes the volume of the sampling chamber 200, R denotes a gas constant, T denotes the temperature in the sampling chamber 200, and $n_1$ and $n_2$ denotes a mass of a first gas component (for example, the target gas component) and a mass of a second gas component (for example, the background gas component) in the sampling chamber 200, respectively. The calculation methods of $n_1$ and $n_2$ can be referred to the equation (II).

The amount of each gas component can be regulated according to the desired mass concentration of the gas in the sampling chamber 200 and/or the desired pressure in the sampling chamber 200.

S20 can further include:

S212, regulating the humidity and/or the temperature in the sampling chamber 200 via the humidity regulation device 500 and the temperature regulation device 600.

In this embodiment, by regulating one environmental parameter via the corresponding valve/switch, a single-factor static detection can be performed. By regulating two or more environmental parameters via the corresponding valve(s)/switch(es), a multi-factor static detection can be performed.

In another embodiment, the S20 can include:

S221, opening the gas outputting valve 420 and the gas feeding valve 120 disposed on the branch gas feeding tube 114 configured to convey the background gas component to allow the background gas component to flow through the sample chamber 200 thereby obtaining a dynamic environment; and opening the gas feed valve 120 disposed on the branch gas feeding tube 114 configured to convey the target gas component to allow the target gas component to flow through the sample chamber 200.

The dynamic detection can be performed in the dynamic environment. The flow rate of the gas flowing through the sample chamber 200 can be regulated by regulating the flow rate of the background gas component, the flow rate of the target gas component, and the flow rate of the gas output from the sample chamber 200 by regulating the corresponding gas feeding valves 120 and the gas outputting valve 420. The plurality of flowmeters can be used to monitor the corresponding flow rates.

S221 can further include:

regulating the composition of the gas in the sample chamber 200, the mass concentration of the target gas component in the sample chamber 200, the flow rate of the gas flowing through the sample chamber 200, and/or the pressure in the sample chamber 200 via the plurality of gas feeding valves 120 and the gas outputting tube 420.

The composition of the gas in the sample chamber 200, the mass concentration of the target gas component in the sample chamber 200, the flow rate of the gas flowing through the sample chamber 200, and/or the pressure in the sample chamber 200 can be regulated by regulating the flow rate of each gas component entering into the main gas feeding tube 110 and the flow rate of gas output from the sample chamber 200.

S20 can further include:

S223, regulating the humidity and/or the temperature in the sampling chamber 200 via the humidity regulation device 500 and the temperature regulation device 600.

In this embodiment, by regulating one environmental parameter via the corresponding valve/switch, a single-factor dynamic detection can be performed. By regulating two or more environmental parameters via the corresponding valve(s)/switch(es), a multi-factor dynamic detection can be performed.

In the present disclosure, the single-factor static/dynamic detection can be achieved by regulating one environmental parameter while the other environmental parameters can be constant, so that the influence of the parameter regulated during the static/dynamic detection on the terahertz spectrum of the target gas can be obtained. A multi-factor static/dynamic detection can be achieved by regulating two or more environmental parameters, while the other environmental parameters can be constant, so that the interaction effect of two or more parameters during the static/dynamic detection on the terahertz spectrum of the target gas can be obtained. The influences of one or more of environmental parameters and interaction effect thereof on the gas detection result can be utilized to reduce a background noise of the terahertz spectrum and is favorable to the quantitative analysis and the qualitative analysis of the gas.

In an embodiment, the regulating the humidity in the sample chamber 200 can include regulating the amount and/or the flow rate of the liquid water and/or water vapor supplied to the sample chamber 200 via the humidity regulating valve 520. In an embodiment, the regulating the humidity in the sample chamber 200 can further include turning on the hygrometer switch to obtain the real-time humidity in the sample chamber 200 and regulating the amount and/or the flow rate of the liquid water and/or water vapor supplied to the sample chamber 200 according to the real-time humidity and the expected humidity in the sample chamber 200.

In an embodiment, the regulating the temperature in the sample chamber 200 can further include: turning on the heater switch to regulate the temperature in the sample chamber 200. In an embodiment, the regulating the temperature in the sample chamber 200 can further include turning on the thermometer switch to measure and display the real-time temperature in the sample chamber 200, and regulating the heater according to the real-time temperature and the expected temperature in the sample chamber 200.

In an embodiment, the regulating the pressure in the sample chamber 200 can include: regulating the amount and/or the flow rate of each gas component via each of the plurality of gas feeding valves 120, and/or regulating the amount and/or the flow rate of the gas output from the sample chamber 200 via the gas outputting valve 420. In an embodiment, the regulating the pressure in the sample chamber 200 can further include: turning on the pressure gage switch to measure and display the real-time pressure in the sample chamber 200, and regulating the amount and/or the flow rate of each gas component and/or regulating the amount and/or the flow rate of the gas output from the sample chamber 200 according to the real-time pressure and the expected pressure in the sample chamber 200.

In an embodiment, the regulating the flow rate of the gas flowing through the sample chamber 200 can include: regulating the flow rate of each gas component via each of the plurality of gas feeding valves 120, and/or regulating the flow rate of the gas output from the sample chamber 200 via the gas outputting valve 420. In an embodiment, the regulating the flow rate of the gas flowing through the sample chamber 200 can further include: turning on the anemometer to measure and display the real-time flow rate of the gas flowing through the sample chamber 200, and regulating the flow rate of each gas component and/or regulating the flow rate of the gas output from the sample chamber 200 according to the real-time flow rate of the gas flowing through the sample chamber 200 and the expected flow rate of the gas flowing through the sample chamber 200.

In S30 and S40, the terahertz wave can enter into the sample chamber 200 with the regulated environment, interact with the gas, exit from the sample chamber 200, and arrive at the terahertz wave detecting unit to generate a terahertz spectrum of the gas in the regulated environment of the sample chamber 200. The quantitative analysis and the qualitative analysis of the gas can be achieved based on the terahertz spectrum and the environmental parameters.

In the present disclosure, the environmental parameters inside the sample chamber 200 can be regulated via one or more of the gas feeding unit 100, the gas outputting unit 400, the humidity regulation device 500, the temperature regulation device 600, the pressure gauge 700, and the anemometer 800. The environmental parameters can include one or more of the humidity, the temperature, the pressure in the sample chamber 200, and the composition, the mass concentration, and the flow rate of the gas in the sample chamber 200. A single-factor static detection, a multi-factor static detection, a single-factor dynamic detection, and a multi-factor dynamic detection can be achieved. Therefore, the influences of one or more of environmental parameters on the gas detection result can be investigated and utilized to reduce a background noise of the terahertz spectrum, which is favorable to the quantitative analysis and the qualitative analysis of the gas.

It should be understood that although each step may be displayed in succession as indicated, these steps may not necessarily be executed in succession in the order indicated by the arrows of FIG. 1. Unless expressly described herein, the execution of these steps may not be limited to a strict order; instead, the steps can be executed in another order. In addition, at least some steps may include multiple sub-steps or multiple stages. These sub-steps or stages may not necessarily be executed or completed at the same moment, but can be executed at different times, and the order of execution thereof may also not necessarily be in succession, but can be executed in turn or alternately with at least some other steps or sub-steps or stages of other steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A gas detecting apparatus based on terahertz spectroscopy, comprising:
    a sample chamber allowing a terahertz wave to pass therethrough;
    a gas feeding unit connected to the sample chamber to feed gas into the sample chamber;
    a gas outputting unit connected to the sample chamber to output gas from the sample chamber; and
    a vacuum pump connected to the sample chamber to evacuate the sample chamber;
    wherein the apparatus further comprises one or more of:
    a pressure gauge disposed on the sample chamber to measure a pressure in the sample chamber;
    an anemometer disposed on the sample chamber to measure a gas flow rate in the sample chamber;
    a humidity regulation device connected to the sample chamber to regulate humidity in the sample chamber; and
    a temperature regulation device connected to the sample chamber to regulate temperature in the sample chamber;
    wherein the gas feeding unit comprises a gas feeding tube connected to the sample chamber, the gas feeding tube comprises a main gas feeding tube and a plurality of branch gas feeding tubes, one end of the main gas feeding tube is connected to the sample chamber, and the other end of the main gas feeding tube is connected to the plurality of branch gas feeding tubes; and
    the gas feeding unit further comprises a plurality of gas feeding valves respectively disposed on the plurality of branch gas feeding tubes.

2. The apparatus of claim 1, further comprising a background gas source and a target gas source, wherein one of the plurality of branch gas feeding tubes is connected to the background gas source, and another of the plurality of branch gas feeding tubes is connected to the target gas source.

3. The apparatus of claim 2, wherein the target gas source comprises a first gas source and a second gas source different in component with the first gas source, two of the plurality of branch gas feeding tubes are respectively connected to the first gas source and the second gas source.

4. The apparatus of claim 1, wherein the humidity regulation device comprises:
    a moisture supplying device configured to be in fluid communication with the sample chamber to supply liquid water and/or water vapor into the sample chamber; and
    a humidity regulating valve disposed between the moisture supplying device and the sample chamber to regulate an amount and/or a flow rate of the liquid water and/or water vapor supplied into the sample chamber.

5. The apparatus of claim 4, wherein the humidity regulation device further comprises:
    a filter disposed between the moisture supplying device and the sample chamber to filter the liquid water and/or water vapor supplied into the sample chamber.

6. The apparatus of claim 4, wherein the humidity regulation device further comprises:
    a hygrometer disposed on the sample chamber to measure the humidity in the sample chamber.

7. The apparatus of claim 1, wherein the temperature regulation device comprises:
    a heater disposed on the sample chamber to heating the gas in the sample chamber; and
    a thermometer disposed on the sample chamber to measure the temperature in the sample chamber.

8. The apparatus of claim 1, wherein the anemometer is an anemorumbometer, and the vacuum pump is a molecular pump.

9. The apparatus of claim 1, further comprising a terahertz wave generating unit and a terahertz wave detecting unit disposed outside the sample chamber, the terahertz wave generating unit is configured to send the terahertz wave into the sample chamber from a first side of the sample chamber, the terahertz wave detecting unit is configured to detect the terahertz wave transmitted out from a second side opposite to the first side of the sample chamber.

10. The apparatus of claim 9, wherein the gas feeding unit is disposed at the first side of the sample chamber, and the gas outputting unit is disposed at the second side of the sample chamber.

11. A method for detecting gas based on terahertz spectroscopy by using the apparatus of claim 1, comprising:
    evacuating the sample chamber by using the vacuum pump;
    feeding the gas into the evacuated sample chamber via the gas feeding unit, and regulating one or more environmental parameters inside the sample chamber via one or more of the gas feeding unit, the gas outputting unit, the humidity regulation device, and the temperature regulation device;
    having the terahertz wave passing through the sample chamber and interacting with the gas in the sample chamber; and
    detecting the terahertz wave transmitted out from the sample chamber to obtain a terahertz spectrum.

12. The method of claim 11, before the detecting the terahertz wave, further comprising closing the gas feeding unit and the gas outputting unit, thereby obtaining a gas flow static environment in the sample chamber during the detecting the terahertz wave.

13. The method of claim 11, wherein the detecting the terahertz wave is proceeded during the gas flowing through the sample chamber thereby obtaining a gas flow dynamic environment in the sample chamber during the detecting the terahertz wave.

14. The method of claim 11, wherein
    the regulating one or more environmental parameters inside the sample chamber comprises:
    regulating a gas composition, a concentration of a target gas component, and/or a pressure in the sample chamber via the plurality of gas feeding valves.

15. The method of claim 14, wherein the detecting the terahertz wave is proceeded during the regulating the gas composition, the concentration of the target gas component, and/or the pressure in the sample chamber.

16. The method of claim 11, wherein the apparatus comprises the humidity regulation device, the regulating one or more environmental parameters inside the sample chamber comprises: regulating the humidity in the sampling chamber via the humidity regulation device.

17. The method of claim 11, wherein the apparatus comprises the temperature regulation device, the regulating one or more environmental parameters inside the sample chamber comprises: regulating the temperature in the sampling chamber via the temperature regulation device.

* * * * *